US 6,326,894 B1

(12) United States Patent
McGrath (10) Patent No.: US 6,326,894 B1
(45) Date of Patent: Dec. 4, 2001

(54) PIPELINE LEAK MONITORING SYSTEM (75) Inventor: David F. McGrath, Garden Ridge, TX (US)

(73) Assignee: Senior Investments AG (CH)

(*) Notice: Subject to any disclaimer, the term of this patent is extended or adjusted under 35 U.S.C. 154(b) by 0 days.

(21) Appl. No.: 09/659,272

(22) Filed: Sep. 12, 2000

(51) Int. Cl.$^7$ .................................................. G08B 21/00
(52) U.S. Cl. ....................... 340/605; 340/632; 73/40.5 R; 73/40.7
(58) Field of Search .................................... 340/605, 606, 340/609, 610, 611, 632, 618, 870.16, 870.17; 73/40.5 R, 40.7

(56) References Cited

U.S. PATENT DOCUMENTS

| 4,369,647 | * | 1/1983 | Shigemori et al. | 340/634 |
| 4,557,139 | * | 12/1985 | Cantwell et al. | 73/40.7 |
| 4,644,780 | * | 2/1987 | Jeter | 73/40.5 R |
| 5,357,781 | * | 10/1994 | Tikijian | 340/632 |
| 5,625,141 | * | 4/1997 | Mahoney et al. | 73/40.7 |
| 6,131,960 | * | 10/2000 | McHughs | 285/302 |

* cited by examiner

Primary Examiner—Van T. Trieu
(74) Attorney, Agent, or Firm—Dick and Harris (57) ABSTRACT A notification system for monitoring and detecting the integrity of an expansion joint and delivering an indication of the expansion joint's integrity to a remote location. The preferred embodiment of the apparatus is comprised of a sensor for detecting the environments condition between two or more plies of a bellows, and transmitting a corresponding signal to a control apparatus, the control apparatus capable of making a comparative analysis of the sensor's signal with two or more predetermined parameters. Based upon the results of the comparative analysis, if the control apparatus determines the deviation in the environmental characteristics are unacceptable, the control apparatus transmits a signal to a message transmittal apparatus which transforms the signal into a communication signal. The communication signal is then transmitted to a remote location as notification of the expansion joint's integrity in the form of, but not limited to, a phone call, voice mail, electronic mail, pager message, facsimile, or web site.

16 Claims, 4 Drawing Sheets

PIPELINE LEAK MONITORING SYSTEM

BACKGROUND OF THE INVENTION

1. Field of the Invention

The present invention is directed to expansion joints for gas pipelines and maintenance systems therefor. In particular, the present invention relates to a device for the automatic monitoring, detection, and notification of failure for the control and maintenance of pipeline expansion joints.

2. The Prior Art

It is well known that expansion joints, particularly those involved in gas pipelines, may be subjected to vibration, expansion, contraction, deflection, and bending forces which may eventually lead to failure of the expansion joint.

Typical prior art detection systems for notification of impending failure of an expansion joint require visual inspection of the notification system, which is located in close proximity to the expansion joint. Such notification systems incorporate a sensor that constantly monitors the pressure (or some other characteristic) between two adjacent plies of an expansion joint, such as two adjacent layers of a multiple ply bellows. For example, when a pressure change between the plies of the expansion joint occurs, indicating failure of one (usually an inner one) of the plies, a mechanical pop-up button is actuated and exposed to indicate the at least partial failure of the expansion joint. However, because the pop-up button notification system is in close proximity to the expansion joint, notification of the failure to relevant personnel only occurs when such personnel are inspecting the joint in person. Because such inspections occur over significant intervals of time, the time period between the actual expansion joint's failure, including the subsequent activation of the pop up button, and the actual detection of the failure can be considerable, and total failure of the joint may occur before inspection takes place.

Furthermore, such pop-up button type failure detection and notification systems typically are only activated when the pressure differential reaches and exceeds, for a sustained period of time, a specific value.

It would be desirable to provide an expansion joint monitoring and notification device that provides reliable automatic notification to a remote location of the expansion joint's integrity and thereby eliminates the requirement of direct visual observation and actual proximate physical presence of personnel before a failure is detected.

It would further be desirable to provide a monitoring and notification device that could be able to give notification of the status of a expansion joints integrity by constant or periodic evaluations, enabling for the possibility of predicting the potential and time period before expansion joint failure occurs.

These and other desirable characteristics of the present invention will become apparent in view of the present specification, including the claims, and the drawings.

SUMMARY OF THE INVENTION

The proposed invention is directed to a notification system for monitoring an expansion joint and delivering an indication of failure of the expansion joint to a remote location, wherein the period between the joints actual failure and detection of the failure is not dependent upon the occurrence of an actual visual inspection of the expansion joint or sensor by a qualified technician. Instead, with the proposed invention, notification indicative of the expansion joint's integrity may, depending upon a qualified characteristic of the environment, be sent to a remote location, thereby automatically alerting workers of the expansion joints integrity.

The present invention is directed, in part, to a notification system for monitoring an expansion joint and delivering an indication of failure of the expansion joint to a remote location, the expansion joint having a bellows seal incorporating at least two plies.

The notification system comprises a sensor, operably configured to sense and respond to environmental conditions existing between two adjacent ones of the at least two plies of the expansion joint, the sensor being further operably configured to generate a first signal corresponding to a particular value of at least one quantifiable characteristic of the environment existing between two adjacent ones of the at least two plies of the expansion joint.

A control apparatus, operably connected to the sensor and configured to receive the first signal corresponding to a particular value of at least one quantifiable characteristic of the environment existing between two adjacent ones of the at least two plies of the expansion joint generated by the sensor. The control apparatus being further operably configured to compare the first signal received from the sensor with numerical values stored in memory corresponding to acceptable and unacceptable environmental conditions between the two adjacent ones of the at least two plies of the expansion joint, and determine whether the received first signal corresponds to an acceptable environmental condition or an unacceptable environmental condition. The control apparatus further being operably configured, upon determination that the received first signal corresponds to an unacceptable environmental condition, to generate a second signal.

A message transmittal apparatus is operably configured to receive the second signal generated by the control apparatus, and in response thereto transmit a message to at least one designated recipient, at a location remote from the expansion joint, advising the recipient of the sensed unacceptable environmental condition at the monitored expansion joint.

In alternative embodiments of the invention, the notification system comprises a sensor operably configured to detect gas pressure, temperature, gas composition, or gas flow rates.

Additionally, in alternative embodiments of the invention, the transmittal apparatus is operably configured to transmit the message to at least one recipient in the form of electronic mail, a facsimile, pager message, a pre-recorded phone message, or a web site.

The present invention is also directed to a method for monitoring an expansion joint and delivering an indication of failure of an expansion joint to a remote location, the expansion joint having a bellows seal incorporating at least two plies.

The notification system comprises the steps of:
- sensing, with a suitably positioned sensor, one or more environmental conditions existing between two adjacent ones of the at least two plies of the expansion joint,
- generating a first signal corresponding to a particular value of at least one quantifiable characteristic of the environment existing between two adjacent ones of the at least two plies of the expansion joint;
- comparing, with a control apparatus, the first signal received from the sensor with numerical values stored in memory in the control apparatus, corresponding to acceptable and unacceptable environmental conditions between the two adjacent ones of the at least two plies of the expansion joint, and determining whether the received signal corresponds to an acceptable environmental condition or an unacceptable environmental condition, generating a second signal with the control apparatus, upon determination that the received first signal corresponds to an unacceptable environmental condition;

transmitting a message to at least one designated recipient, at a location remote from the expansion joint, advising the recipient of the sensed unacceptable environmental condition, with a message transmittal apparatus operably configured to receive the second signal generated by the control apparatus.

The method further preferably comprises alternative apparatuses for sensing, gas pressure, temperature, gas composition, or gas flow rates.

The method further comprises alternative transmittal apparatuses configured for transmitting the message to at least one recipient in the form of electronic mail, a facsimile, pager message, a pre-recorded phone message, or a web site.

DETAILED DESCRIPTION OF THE DRAWINGS

While this invention is susceptible of embodiment in many different forms, there is shown in the drawings and will be discussed herein in detail, a preferred embodiment of the invention, with the understanding that the present disclosure is intended to be considered as an exemplification of the principles of the invention and is not intended to limit the invention to the embodiment illustrated.

Figure 1:
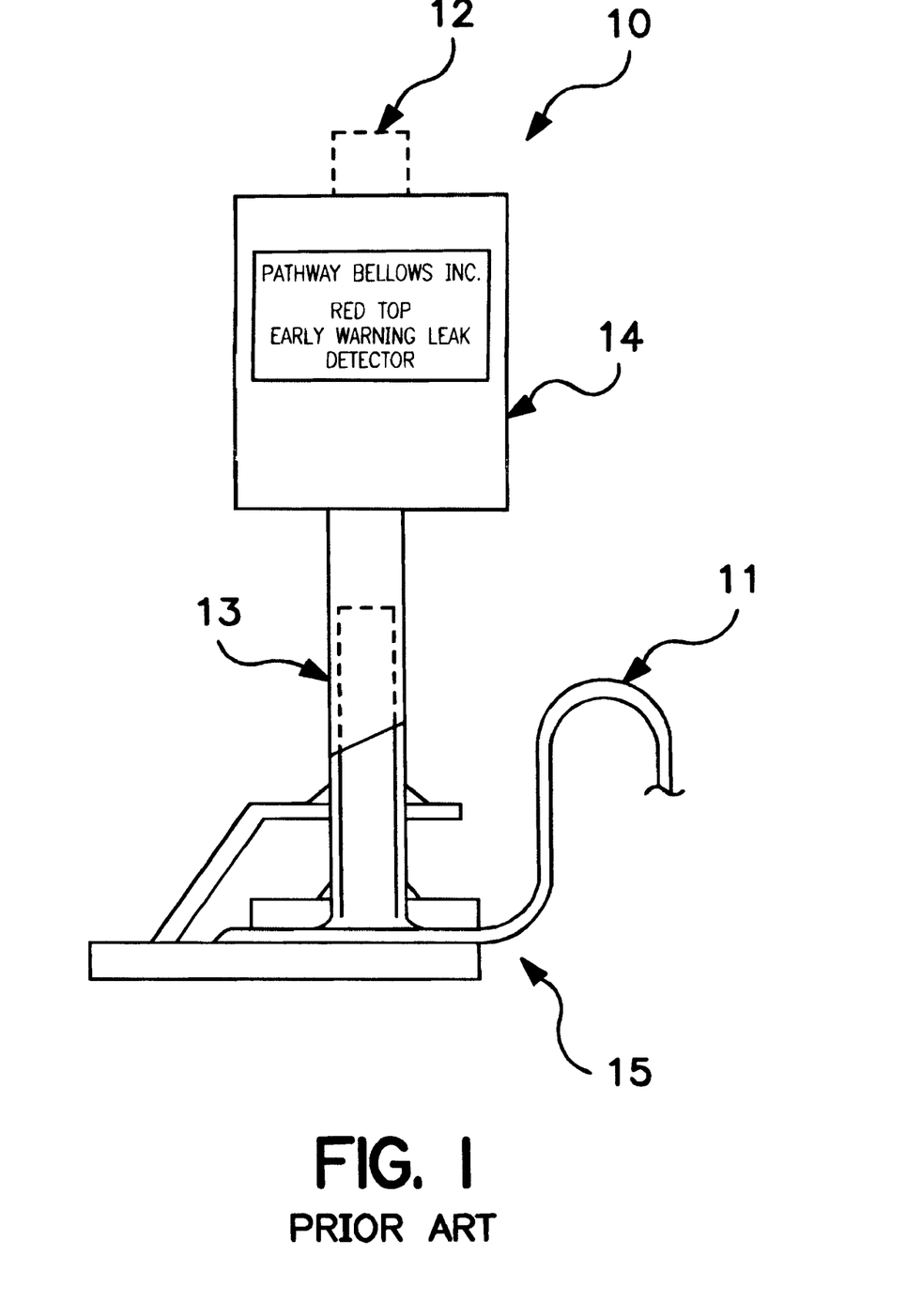
FIG. 1 is a view of a prior art expansion joint leak warning system showing a pop-up button notification system attached in close proximity to a multiple ply expansion joint.

FIG. 1 shows a frontal view of a prior art pop up button notification system 10 positioned in close proximity to expansion joint 15, the operation and configuration of such notification systems being well known by those of ordinary skill and knowledge in the art. For example, within housing 14 may be a chamber that includes a spring-biased button 12, which may be held in place by frangible or releasable member (not shown), that is, in turn, connected to a simple mechanical pressure sensing mechanism (not shown). Housing 14 is connected in fluid communication with the space between adjacent layers of bellows 11 of expansion joint 15, for example, via hollow pipe support 13. Typically, the pressure sensing mechanism will be configured so that the frangible or releasable member will hold the button 12 within housing 14, and thus out of sight, so long as the pressure differential being sensed (between the atmosphere and the pressure between the plies) stays below (or above) a preselected value. When the pressure drops below or exceeds the preselected value for a predetermined period of time (like the way an electrical fuse works), the pressure sensing mechanism will cause the frangible or releasable member breaks or releases the button, permitting it to pop up and be exposed, indicating a failure of at least one of the layers of the bellows. However, because visual observation of the pop-up button 12 requires the proximate physical presence of the observer, the time period before the detection of the failure is dependent upon the frequency of such actual visual inspections of the expansion joint. Consequently, the lapse of time before notification is detected is often dependent upon maintenance schedules, and total failure of the joint may occur before the indication of partial failure has been observed.

Figure 2:
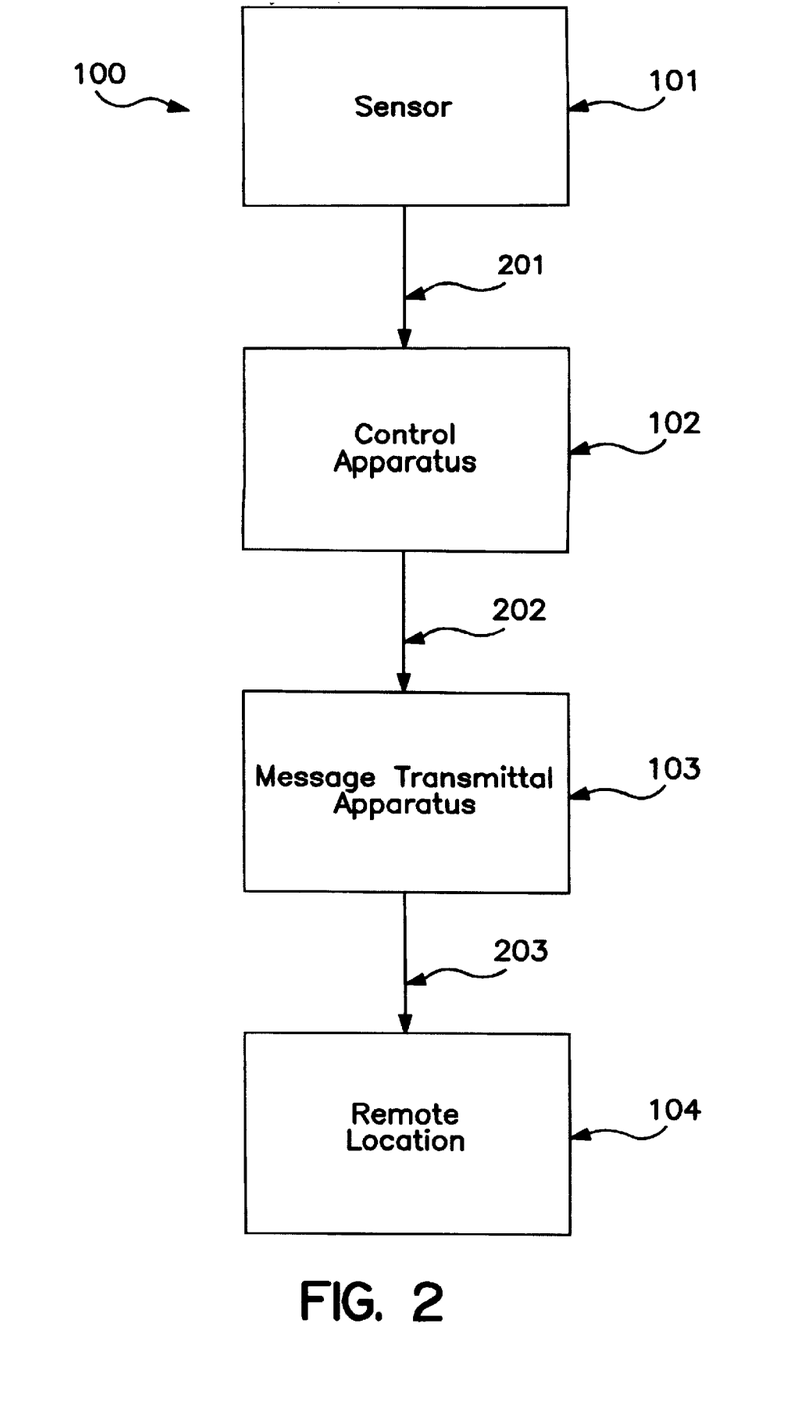
FIG. 2 is a flow chart of a notification system for monitoring and indicating the integrity of an expansion at a remote location, according to a preferred embodiment of the invention.
Figure 3:
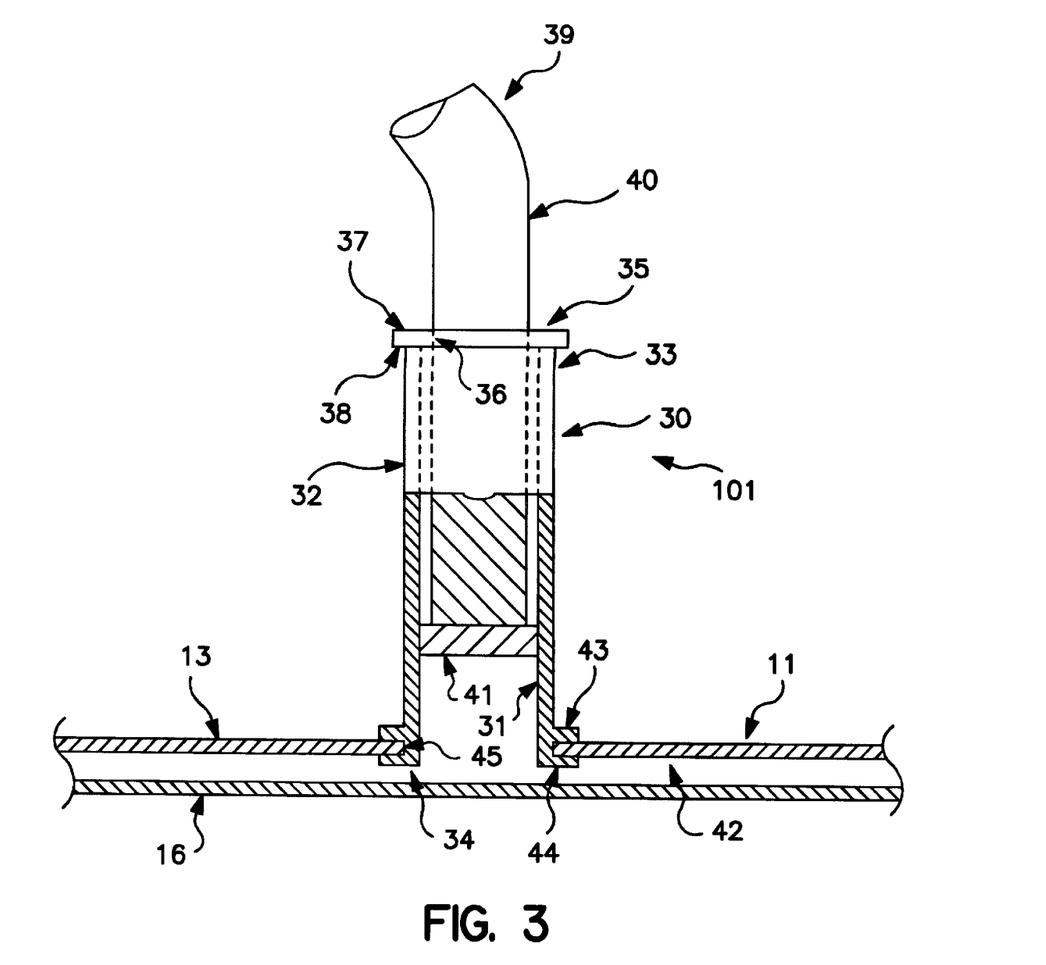
FIG. 3 is a side elevation in section of the sensor apparatus, according to the notification system of the present invention, attached between two plies of a multiple ply expansion joint.
Figure 4:
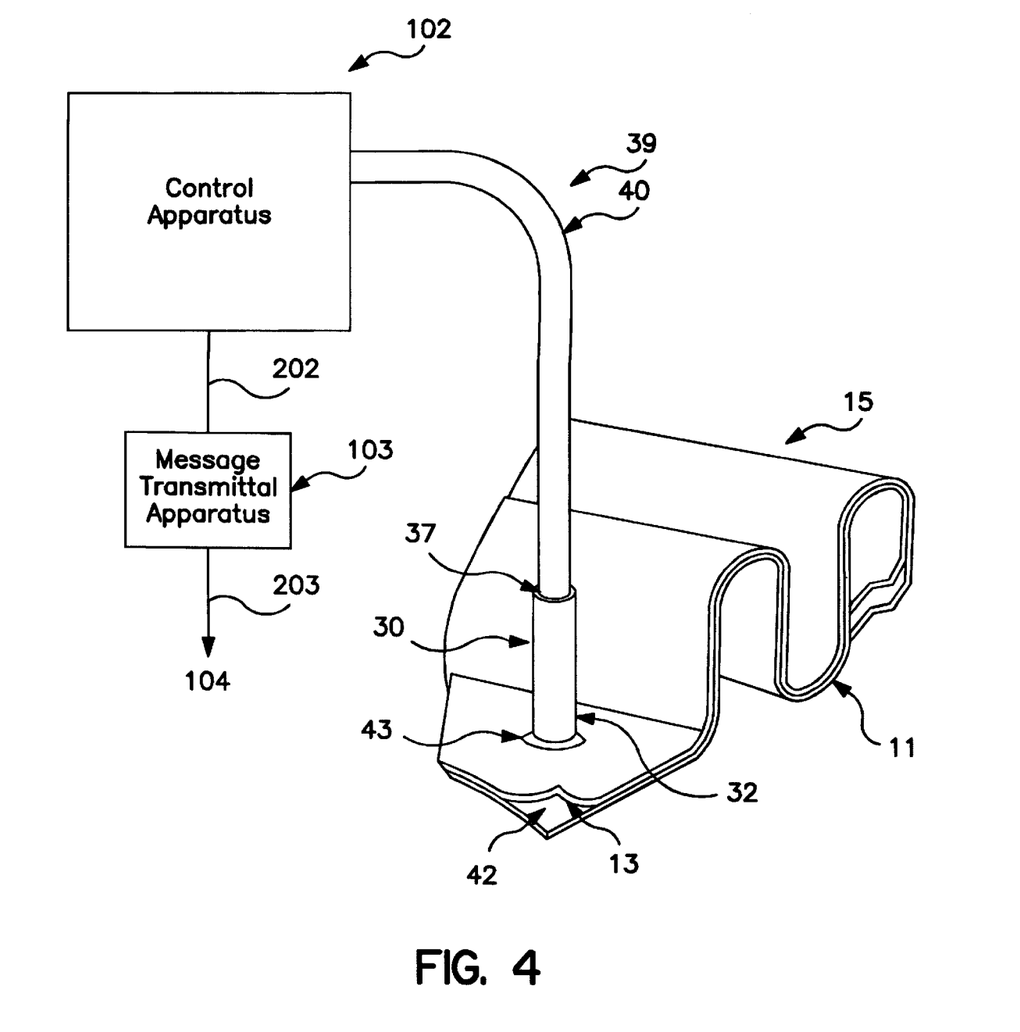
FIG. 4 is a perspective partially schematic view of a portion of the notification system of the present invention, showing the sensor housing attached to a multiple ply bellows expansion joint, with the sensor transmission member passing through the sensor housing and connecting to the control apparatus.

The notification system of the present invention, for monitoring an expansion joint and delivering an indication of the expansion joints integrity to a remote location is shown in FIGS. 2–4. Any component configuration or assembly, which may be disclosed in the drawings, is shown by way of example of a preferred embodiment of the invention, and the invention is not limited thereto. One of ordinary skill and art, having the present disclosure before them will be able to make modifications in the components of the apparatus without departing from the scope of the present invention.

FIG. 2 is a flow chart of a preferred embodiment of the system 100 for providing detection and notification of integrity of an expansion joint. Sensor 101 involves apparatus, configured for detecting one or more environmental conditions existing between two adjacent plies of an expansion joint bellows. Sensor apparatus 101 may be a temperature sensor, a pressure transducer, or other sensor or combination of sensors, as are known and readily commercially available. Preferably, sensor 101 will be configured to generate an output such as an electrical signal or combination of signals, that is representative of the one or more conditions being sensed. Sensor 101 is connected by suitable means (such as electrical connection) to control apparatus 102, which may be a computer or programmable controller of conventional construction. Control apparatus 102 is, in turn, connected to a message transmittal apparatus 103, for transmitting a message representative of the one or more sensed conditions to a remote location 104. Message transmittal apparatus 103 may be any of a number of possible systems, such as a set of programmed email or fax transmission messages, set to be automatically sent to one or more desired recipients, electrical connections to one or more warning indicator lights and/or annunciators at a remote control room, etc. In each such case, the character of the messages sent via the message transmittal apparatus 103 will be dependent upon the result of the analysis conducted by control apparatus 102, and the resultant instruction signals sent by control apparatus 102 to message transmittal apparatus 103.

Sensor 101 may be configured to transmit a steady state signal to control apparatus 102, which varies with the conditions in the space between the adjacent plies. Such a signal could be representative of an absolute value of an environmental characteristic. Alternatively, sensor 101 may simply be configured to send signals only when there is a change in the sensed characteristic that is greater than a certain value, so that transient changes below a certain amplitude are not transmitted and are eliminated as "noise". Such a signal could be representative of the value of a change in a base value that is presumed and "built in" to the system. Regardless of the set up that is used, sensor 101 generates and subsequently transmits a status signal 201 representative of the sensed environmental condition(s). Control apparatus 102 receives the transmitted status signal 201.

Control apparatus 102 is configured to interpret signal 201 as representing one or more numerical values of one or more characteristics (e.g., pressure, temperature, etc.) of the region between the adjacent plies of the bellows of an expansion joint. Those numerical values are compared with predetermined parameters stored in memory as numerical values corresponding to various acceptable conditions, and various failure conditions of an expansion joint. If the comparative analysis results in a determination that the environmental conditions) sensed are acceptable, control apparatus 102 may take no further actions, or may send a further signal to message transmittal apparatus. However, if a comparative analysis results in a determination that there has been an unacceptable deviation in the environment's condition, control apparatus 102 will generate and transmit a second signal 202 to message transmittal apparatus.

Message transmittal apparatus 103 then receives the second signal 202 from the control apparatus 102. Depending upon the character of the second signal 202 (i.e., whether corresponding to a nominal functional state, or to a failure condition), message transmittal apparatus 103 will be instructed to transmit an appropriate message 203 to one or more designated recipients at one or more remote locations 104. The message 203 may be sent as an analog or digital signal to a remote location 104 in the form of, for example and depending upon the combination of devices making up message transmittal apparatus 103, a prerecorded telephone message, pager message, facsimile, electronic mail, or communication through a web site.

FIG. 3 illustrates sensor apparatus 101, according to one embodiment of the invention. Sensor housing 30 has inner surface 31, outer surface 32, top portion 33, and bottom portion 34. Sensor housing 30 is positioned adjacent to the multiple ply bellows 11. Preferably, the connection of sensor housing 30 to the outermost ply 13 will be configured to be an air- and liquid-tight seal, to ensure accurate sensing of the conditions between ply 13 and ply 16. The seal may be preferably formed around outer ply 13 of multiple ply bellows 11 by upper flange 43 and lower flange 44. Bottom portion 34 of sensor housing 30 is preferably operably configured to allow sensor 41 exposure to the environmental characteristics of passage 42 between bellows outer ply 13 and inner ply 16 of two adjacent plies of an expansion joint 15.

Sensor 41, sized to fit in inner surface 31 of sensor housing 30, generates and transmits through transmission member 39, signal 201 representative of the sensed environmental characteristics of the passage 42. Transmission member 39, having an outer surface 32 sized to fit into the inner surface 31 protrudes through the top portion 33 of the sensor housing 30. Top portion 33 of sensor housing 30 includes a cover 35 having upper surface 37, lower surface 38, aperture 36 and outer surface 46 larger than inner surface 31 of sensor housing 31. Aperture 36 preferably is sized in relation with outer surface 40 of transmission member 39 and sealed thereto, to prevent leakage to the ambient, to ensure accuracy of the sensor readings. Transmission member 39 may be an electrical cable, a shielded mechanical cable, or even a fluid passage, depending upon the kind of signal that is created by the sensor and transmitted to control apparatus 102. In a still further alternative, transmission member 39 may be a wireless transmitter, for transmitting a wireless signal to a suitably constructed control apparatus 102 having a wireless signal-receiving device connected thereto.

FIG. 4 shows transmission member 39 extending from sensor housing 30 and connecting to control apparatus 102, which as previously indicated may be a computer or programmable controller or the like.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A notification system for monitoring an expansion joint and delivering an indication of failure of the expansion joint to a remote location, the expansion joint having a bellows seal incorporating at least two plies forming a region therebetween, the notification system comprising:

a sensor, operably connected to the region between two adjacent ones of the at least two plies of the bellows seal, and configured to sense and respond to environmental conditions existing between the two adjacent ones of the at least two plies of the bellows seal, the sensor being further operably configured to generate a first signal corresponding to a particular value of at least one quantifiable characteristic of the environment existing between two adjacent ones of the at least two plies of the bellows seal;

a control apparatus, operably connected to the sensor and configured to receive the first signal corresponding to a particular value of at least one quantifiable characteristic of the environment existing between two adjacent ones of the at least two plies of the bellows seal generated by the sensor, the control apparatus being further operably configured to compare the first signal received from the sensor with numerical values stored in memory corresponding to acceptable and unacceptable environmental conditions between the two adjacent ones of the at least two plies of the bellows seal, and determine whether the received first signal corresponds to an acceptable environmental condition or an unacceptable environmental condition, the control apparatus further being operably configured, upon determination that the received first signal corresponds to an unacceptable environmental condition, to generate a second signal;

a message transmittal apparatus operably configured to receive said second signal generated by the control apparatus, and in response thereto transmit a message to at least one designated recipient, at a location remote from the expansion joint, advising the recipient of the sensed unacceptable environmental condition at said monitored expansion joint.

2. The notification system according to claim 1, wherein the sensor is operably configured to detect gas pressure.

3. The notification system according to claim 1, wherein the sensor is operably configured to detect temperature.

4. The notification system according to claim 1, wherein the sensor is operably configured to detect gas composition.

5. The notification system according to claim 1, wherein the sensor is operably configured to detect gas flow rates.

6. The notification system according to claim 1, wherein the message transmittal apparatus is operably configured to transmit the message to the at least one recipient in the form of electronic mail.

7. The notification system according to claim 1, wherein the message transmittal apparatus is operably configured to transmit the message to the at least one recipient in the form of a facsimile.

8. The notification system according to claim 1, wherein the message transmittal apparatus is operably configured to transmit the message to the at least one recipient in the form of a pre-recorded phone message.

9. A method for monitoring an expansion joint and delivering an indication of failure of an expansion joint to a remote location, the expansion joint having a bellows seal incorporating at least two plies forming a region therebetween, the notification system comprising the steps of:

sensing, with a suitably positioned sensor connected to the region between two adjacent ones of the at least two plies of the bellows seal, one or more environmental conditions existing between the two adjacent ones of the at least two plies of the bellows seal, generating a first signal corresponding to a particular value of at least one quantifiable characteristic of the environment existing between two adjacent ones of the at least two plies of the bellows seal;

comparing, with a control apparatus, the first signal received from the sensor with numerical values stored in memory in the control apparatus, corresponding to acceptable and unacceptable environmental conditions between the two adjacent ones of the at least two plies of the bellows seal, and determining whether the received signal corresponds to an acceptable environmental condition or an unacceptable environmental condition, generating a second signal with the control apparatus, upon determination that the received first signal corresponds to an unacceptable environmental condition;

transmitting a message to at least one designated recipient, at a location remote from the expansion joint, advising the recipient of the sensed unacceptable environmental condition, with a message transmittal apparatus operably configured to receive the second signal generated by the control apparatus.

10. The method according to claim 9, wherein the sensor is operably configured to detect gas pressure.

11. The method according to claim 9, wherein the sensor is operably configured to detect temperature.

12. The method according to claim 9, wherein the sensor is operably configured to detect gas composition.

13. The method according to claim 9, wherein the sensor is operably configured to detect gas flow rates.

14. The method according to claim 9, further comprising the step of:

transmitting the message to the at least one recipient in the form of electronic mail.

15. The method according to claim 9, further comprising the step of:

transmitting the message to the at least one recipient in the form of a facsimile.

16. The method according to claim 9, further comprising the step of:

transmitting the message to the at least one recipient in the form of a prerecorded phone message.

* * * * *

UNITED STATES PATENT AND TRADEMARK OFFICE
CERTIFICATE OF CORRECTION

PATENT NO.   : 6,326,894 B1
DATED        : December 4, 2001
INVENTOR(S)  : McGrath It is certified that error appears in the above-identified patent and that said Letters Patent is hereby corrected as shown below:

<u>Title page,</u>
Item [57], ABSTRACT,
Line 5, delete "environments", and insert -- environment's --

<u>Column 1,</u>
Line 34, insert hyphen -- - -- between "pop" and "up"
Line 49, before "expansion", delete "a" and insert -- an --
Line 49, delete "joints", and insert -- joint's --
Line 62, delete "joints", and insert -- joint's --

<u>Column 2,</u>
Line 3, delete "joints", and insert -- joint's --

<u>Column 3,</u>
Line 29, after "expansion", insert -- joint --
Line 52, insert hyphen -- - -- between "pop" and "up"

<u>Column 4,</u>
Line 6, insert hyphen -- - -- between "pop" and "up"
Line 19, delete "joints", and insert -- joint's --
Line 24, after "and" insert -- knowledge in the --
Line 29, after "of", insert -- the --

UNITED STATES PATENT AND TRADEMARK OFFICE
CERTIFICATE OF CORRECTION

PATENT NO.    : 6,326,894 B1
DATED         : December 4, 2001
INVENTOR(S)   : McGrath

It is certified that error appears in the above-identified patent and that said Letters Patent is hereby corrected as shown below:

<u>Column 5,</u>
Line 15, delete "conditions)" and insert -- condition(s) --
Line 21, after "apparatus", insert -- 103 --
Line 59, after "housing", delete "31", and insert -- 30 --
Line 66, after "alternative", insert -- embodiment --

<u>Column 8,</u>
Line 29, delete "prerecorded" and insert -- pre-recorded --

Signed and Sealed this

Twenty-eighth Day of January, 2003

JAMES E. ROGAN
*Director of the United States Patent and Trademark Office*